(12) United States Patent
Baker (10) Patent No.: US 6,890,637 B2
(45) Date of Patent: May 10, 2005

(54) COMPOSITE MATERIALS, ARTICLES OF MANUFACTURE PRODUCED THEREFROM, AND METHODS FOR THEIR MANUFACTURE

(75) Inventor: Charles Baker, Leawood, KS (US)

(73) Assignee: Elk Composite Building Products, Inc., Dallas, TX (US)

( * ) Notice: Subject to any disclaimer, the term of this patent is extended or adjusted under 35 U.S.C. 154(b) by 0 days.

(21) Appl. No.: 10/201,491

(22) Filed: Jul. 23, 2002

(65) Prior Publication Data

US 2003/0018105 A1 Jan. 23, 2003

Related U.S. Application Data

(62) Division of application No. 09/706,590, filed on Nov. 6, 2000.

(51) Int. Cl.[7] .............. B32B 27/12; B32B 3/26; B32B 5/24; B32B 5/14
(52) U.S. Cl. ............... 428/297.4; 428/304.4; 428/308.8; 428/311.11; 428/325; 428/326
(58) Field of Search ............... 428/36.9, 297.4, 428/306.6, 308.4, 310.5, 311.11, 325, 326, 304.4

(56) References Cited

U.S. PATENT DOCUMENTS

| | | | |
|---|---|---|---|
| 4,791,020 A | 12/1988 | Kokta | 428/326 |
| 5,075,057 A | 12/1991 | Hoedl | 264/115 |
| 5,082,605 A * | 1/1992 | Brooks et al. | 264/40.6 |
| 5,088,910 A | 2/1992 | Goforth et al. | 425/142 |
| 5,194,461 A | 3/1993 | Bergquist et al. | 524/13 |
| 5,406,768 A * | 4/1995 | Giuseppe et al. | 52/730.4 |
| 5,435,954 A | 7/1995 | Wold | 264/115 |
| 5,441,801 A | 8/1995 | Deaner et al. | 428/326 |
| 5,474,722 A * | 12/1995 | Woodhams | 264/45.3 |
| 5,480,602 A | 1/1996 | Nagaich | 264/122 |
| 5,486,553 A | 1/1996 | Deaner et al. | 524/13 |
| 5,497,594 A | 3/1996 | Giuseppe et al. | 52/730.4 |
| 5,498,469 A * | 3/1996 | Howard et al. | 428/218 |
| 5,516,472 A | 5/1996 | Laver | 264/118 |
| 5,518,677 A | 5/1996 | Deaner et al. | 264/142 |
| 5,539,027 A | 7/1996 | Deaner et al. | 524/13 |
| 5,585,155 A | 12/1996 | Heikkila et al. | 428/36.7 |
| 5,656,129 A * | 8/1997 | Good et al. | 162/13 |
| 5,660,016 A | 8/1997 | Erwin et al. | 52/483.1 |
| 5,695,874 A * | 12/1997 | Deaner et al. | 428/326 |
| 5,746,958 A | 5/1998 | Gustafsson et al. | 264/115 |
| 5,773,138 A | 6/1998 | Seethamraju et al. | 428/326 |
| 5,827,462 A * | 10/1998 | Brandt et al. | 264/179 |
| 5,827,607 A | 10/1998 | Deaner et al. | 428/326 |
| D402,770 S | 12/1998 | Hendrickson et al. | D25/141 |
| 5,851,469 A | 12/1998 | Muller et al. | 264/177.1 |
| 5,882,524 A | 3/1999 | Storey et al. | 210/712 |
| 5,902,657 A | 5/1999 | Hanson et al. | 428/36.92 |
| 5,932,038 A * | 8/1999 | Bach et al. | 156/62.2 |
| 5,932,334 A | 8/1999 | Deaner et al. | 428/292.4 |
| 5,948,505 A | 9/1999 | Puppin | 428/121 |
| 5,948,524 A | 9/1999 | Seethamraju et al. | 428/326 |
| 5,953,878 A | 9/1999 | Johnson | 52/582.2 |

(Continued)

Primary Examiner—Rena Dye
Assistant Examiner—C Thompson
(74) Attorney, Agent, or Firm—Baker Botts LLP (57) ABSTRACT

The invention is directed to a plastic fiber article of manufacture having composite-like high strength characteristics. The article of manufacture can be in the form of a panel or board. The panel or board is constructed from low cost fiber materials, industrial grade or high thermal plastic, and other additives to protect the board or panel from ultraviolet light, fugi growth, excessive heat, fire, insect infestation, and/or weathering. The plastic fiber panel or board may be textured and colored to resemble natural wood such as cedar, walnut, or oak. The plastic fiber panel or board is stronger more durable and may be cheaper than natural wood alternative panels or boards.

24 Claims, 2 Drawing Sheets

U.S. PATENT DOCUMENTS

| | | | |
|---|---|---|---|
| 5,973,035 A | 10/1999 | Medoff et al. | 524/13 |
| 5,981,067 A | 11/1999 | Seethamraju et al. | 428/393 |
| 5,985,429 A * | 11/1999 | Plummer et al. | 428/220 |
| 6,004,668 A | 12/1999 | Deaner et al. | 428/326 |
| 6,007,656 A | 12/1999 | Heikkila et al. | 156/180 |
| 6,015,611 A | 1/2000 | Deaner et al. | 428/326 |
| 6,015,612 A | 1/2000 | Deaner et al. | 428/326 |
| 6,054,207 A | 4/2000 | Finley | 428/317.9 |
| 6,103,035 A | 8/2000 | Hanson et al. | 156/73.5 |
| 6,106,944 A | 8/2000 | Heikkila et al. | 428/397 |
| 6,122,877 A | 9/2000 | Hendrickson et al. | 52/520 |
| 6,153,293 A * | 11/2000 | Dahl et al. | 428/310.5 |
| 6,180,257 B1 | 1/2001 | Brandt et al. | 428/532 |
| 6,207,729 B1 | 3/2001 | Medoff et al. | 523/129 |
| 6,210,792 B1 | 4/2001 | Seethamraju et al. | 428/326 |
| 6,258,876 B1 | 7/2001 | Medoff et al. | 524/13 |
| 6,265,037 B1 * | 7/2001 | Godavarti et al. | 428/34 |
| 6,280,667 B1 | 8/2001 | Koenig et al. | 264/68 |
| 6,312,639 B1 | 11/2001 | Ertle et al. | 264/349 |
| 6,342,172 B1 | 1/2002 | Finley | 264/45.3 |
| 6,344,268 B1 | 2/2002 | Stucky et al. | 428/317.9 |
| 6,344,504 B1 * | 2/2002 | Zehner et al. | 524/14 |
| 6,346,160 B1 | 2/2002 | Puppin | 156/88 |
| 6,357,197 B1 | 3/2002 | Serino et al. | 52/738.1 |

* cited by examiner

COMPOSITE MATERIALS, ARTICLES OF MANUFACTURE PRODUCED THEREFROM, AND METHODS FOR THEIR MANUFACTURE

CROSS REFERENCE TO RELATED APPLICATIONS

This application is a divisional of U.S. Ser. No. 09/706,590 filed Nov. 6, 2000.

FIELD OF INVENTION

The present invention relates to a composite material, articles of manufacture produced from the composite material and a method of producing articles of manufacture from the composite material.

BACKGROUND OF THE INVENTION

Wood has been milled into various different shapes for use as structural or decorative components in the building industry, as components in furniture, railcars, trailers, and the like for many, many years. Wood, while structurally strong, useful and well adapted for use in many residential and commercial situations, can have problems under certain circumstances related to the deterioration of the wood components. Another potential problem with using wood for structural components is that the stronger woods are considerably denser than weaker woods, and as a result, tend to be very heavy. This is specifically problematic when weight is a concern. To overcome this problem a straight composite such as fiberglass or carbon fibers can be used which is stronger and lighter than hard woods. It is true that the straight composites provide superior strength with light weight, but the cost is extraordinary making these materials useful only in high value situations. Generally, these composites cannot be used cost effectively in normal wood replacement type applications.

Thus, when an application requires that the wood component be very strong, i.e., a weight bearing wall, hard wood, pretreated soft wood or reinforced soft wood is preferred and as a result the weight of the structure is excessive. Therefore, there is a need for a material that can provide strength without adding excessive weight, and extraordinary cost to the structure where these materials are used. In addition, due to the increase in cost of the milling processes, the reduction in supply, and the increase in the cost of treating lumber, wood products are slowly becoming more expensive as demand increases. Although wood substitutes are currently available (made as a first generation product using recycled polyethylene), it is believed that no one wood substitute provides the strength of real wood, with a decrease in the weight and cost of the final product. In fact, wood is 2–5 times stronger than current wood replacement composites. Wood replacement composites are also very expensive and may cost 2–3 times the cost of construction grade lumber or 20–30% more than treated high grade soft woods.

Accordingly, a substantial need exists for an improved composite material that is equally strong or stronger than traditional milled woods, weights less than milled wood, is maintenance free and is less expensive than milled wood. The present invention provides a composite material that can be shaped to produce articles of manufacture that possesses the favorable aspects of wood without the negative aspects described above.

SUMMARY OF THE INVENTION

The invention is directed to an article of manufacture comprising a fiber material and a thermal plastic. The fiber material may be wood, fiberglass, agricultural by-products, industrial by-products or any other material having a durable wood- or fiber-like consistency. The fiber materials can also be a mixture of different fibers, such as wood and fiberglass, wood and agricultural by-products, etc. The article of manufacture may contain between about 40% to about 70% by weight of the fiber material and about 0.1–30% by weight of the total weight of the article of manufacture of additives. The remainder of the composite material used to make the article of manufacture consist of the thermal plastic material.

The thermal plastic material of the article of manufacture may be polyethylene or polypropylene. This material aids in binding the fiber material together so as to form a strong, durable article of manufacture. In fact, the thermal plastic material actually shrinks to grip the fiber material so as to hold the fiber material in place, as the thermal plastic cools. The article of manufacture may contain between about 30% to about 60% by weight of thermal plastic.

The invention is also directed to a process of producing the article of manufacture. This process produces an article of manufacture comprising fiber material, thermal plastics and additives. The process may use any one or combination of the fibers discussed above. For example, when wood is used in making the article of manufacture, the fibers are first screened through a 20–40 mesh screen and added to a mixing container. The screened fibers are than heated to remove moisture so that air pockets do not form when the water is converted into steam as the fiber material is processed.

Hot thermal plastic material is then added to the mixing container so that it comes in contact with the screened fibers. The thermal plastic material may be added to the screened fibers by injecting the thermal plastic material into the mixing containers. Injection of the hot thermal plastic material into the mixing container allows for precise measuring of the amount of thermal plastic material added to the mixture. Additives are added to the plastics stream as it is heated, melted and mixed.

Once the screened fibers are mixed with the hot thermal plastic, the resulting mixture is then placed in contact with a die. The die is used to produce the shape of the article of manufacture. Once shaped, the article of manufacture is cooled and cut to a desired shape and length. For example, the article of manufacture is cut with an inline saw. Alternatively, the article of manufacture can be directly extruded to the desired shape.

When fiberglass is used as the fiber material instead of wood, the fiberglass is chopped into $\frac{1}{4}$, $\frac{1}{2}$, or $\frac{3}{4}$ inch lengths. Once the fiberglass is the correct size, the fiberglass chop is substituted for wood in the process described above on a weight basis. When fiberglass is mixed with wood to make the composite, fiberglass chop is added to the screened wood and the process described above is unchanged.

In another embodiment, fiberglass can be added to the process as a Twintex™ pellet having 60% fiberglass co-mingled with 40% polypropylene. The percentages may vary and are referred to as the load. The Twintex™ pellets can be chopped in the same $\frac{1}{4}$, $\frac{1}{2}$ or $\frac{3}{4}$ inch lengths as discussed above. Because this is a polypropylene co-mingle the pellet is introduced into the thermal plastic barrel rather than the wood barrel of the extruder.

The article of manufacture produced is durable, strong, and long lasting. These characteristics make the article of manufacture a good replacement for wood, and other structural and decorative materials in places where conditions are extreme and other materials have a short life span. For example, the article of manufacture can be used in the construction of decks, floors, sidewalls in railcars, trucks and trailers as well as fences and residential home construction.

DETAILED DESCRIPTION OF THE INVENTION

The present invention is directed to an article of manufacture comprising a composite material as well as a process for making the article of manufacture. The preferred composite material has a controlled water content which ensures high quality physical properties in the articles of manufacture that are produced from the composite material.

The composite material may contain fibers from a variety of different sources such as wood, fiberglass, industrial by-products and agricultural by-products. Wood fibers that can be used to make the composite material include, but are not limited to, fibers from oak, birch, cedar, maple, and other types of hard wood trees. Fiberglass that can be used to make the composite can be in the form of "chop" or in a pelletized form that is commercially available. Fiberglass may also be used that is already mixed (co-mingled) with polypropylene into strands or pellets. This mixture is also commercially available. Fiberglass can be added to or can be used to replace wood fiber on a one to one basis, however, the increase in cost of fiberglass can be prohibitive. All in all, the choice to use wood, fiberglass, or a fiberglass and wood mixture, can be decided on an individual customer basis.

Industrial by-product fibers that can be used to make the composite include mica industrial by-products. These are sometimes used to add strength, fire retardation or moisture resistance. Agricultural by-product fibers that can be used to make the composite include cornstalks, wheat straw, sisal, bamboo reeds, and hemp as well as others.

Cost, availability and stable supply make wood fibers (880 Million tons a year go to land fills) the preferred fiber source for the composite material. Special needs such as using fiberglass as a fiber source to increase strength of the composite, however, might justify the use of any one of the other fibers listed above, regardless of the increased cost of the fibers as compared to wood.

The composite material contains about 40% to about 70% of fiber material by weight. Preferable, the composite material contains about 60% of fiber by weight. More preferably, the composite material contains about 50% of fiber material by weight.

The amount and type of fiber material used to make the composite material will effect the strength, weight and density of the article of manufacture produced from the composite material. If the fiber material used is very dense, the quantity of this fiber used to make the composite may be lower than if a less dense fiber material is used. While weight may be less than other materials, the real trade off with using a composite material compared to a cheaper alternative is that for a slight increase in cost the product is maintenance free.

One composite embodiment of the invention, uses, a wood chip plastic mix and does not have the same characteristics of a normal high cost, high strength composite such as pure fiberglass. Because the wood chip plastic mix takes on the characteristics of the wood chip itself, it acts very similar to wood. In other words, it is very dense (we replace the cellular air spaces with plastic which makes it as much as 20 to 30% heavier then wood) and in most cases heavier than wood. To eliminate weight, some producers use foaming agents to put air pockets or cells in the composite giving it a wood like characteristic. In the present invention, a computer is used to optimize a profile that maintains the strength (because of the design) but lowers the weight. Even in these cases, the composite material is only slightly lighter than the wood it replaces.

Figure 1:
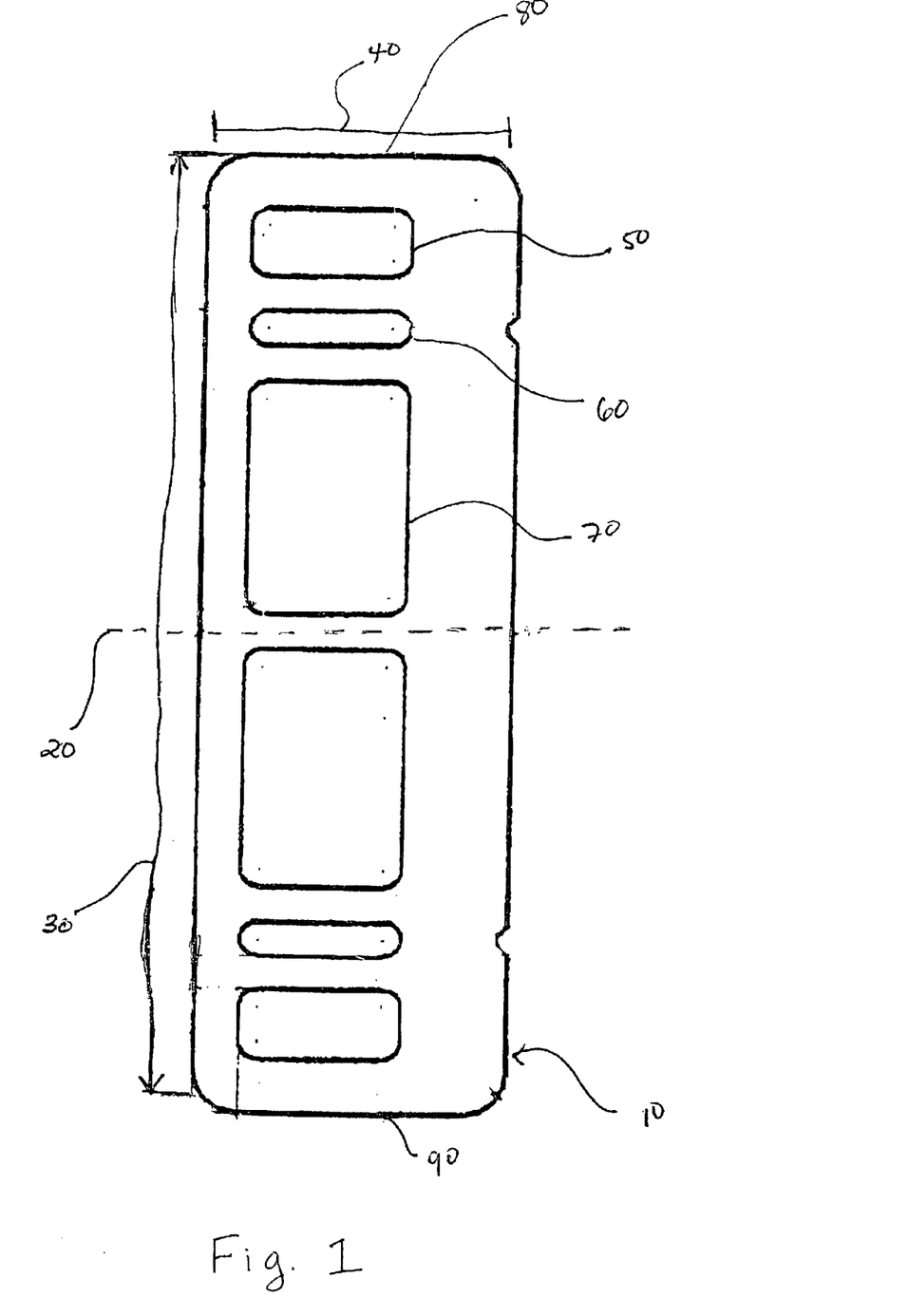
FIG. 1 shows a schematic diagram of a panel having a pattern of "voids" which is made from the composite invention.
Figure 2:
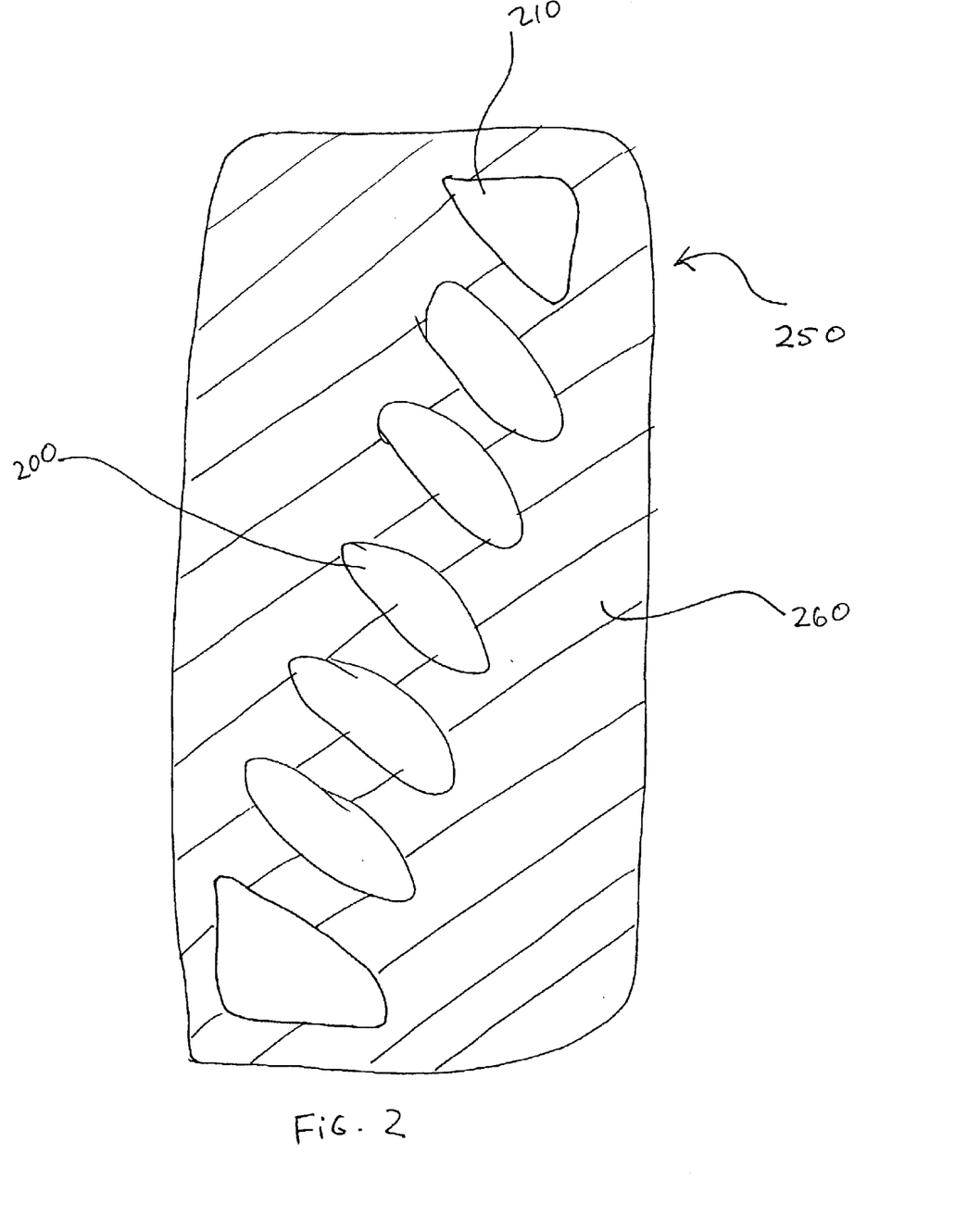
FIG. 2 shows a schematic diagram of a panel having a pattern of "voids" different from that of FIG. 1.

The designs shown in FIGS. 1 and 2 are proprietary designs that aid in providing the same or greater strength of a full panel made of wood (depending on the fiber source and additives used), while being the same or slightly less in weight. All in all, the main advantage of the composite is not that it weighs less than wood, but rather that it is maintenance free, i.e., the bugs will not eat it. It will not rot, split or crack and never needs to be painted.

An article of manufacture made from the present invention is made with polypropylene and is formed in the design shown in FIGS. 1 and 2 and has the strength of wood. The strength of this product is achieved using an engineered polymer (i.e. BP Amoco 9433 polypropylene). Using the engineered polymer increases or maintains the strength of wood but keeps the cost at about the same level as wood. In other words, the cost of this product is very similar to first generation type products, but, wood is still a cheap alternative. As stated above, the trade off between wood and composite is that the composite is maintenance free and has a considerably longer half life as compared to wood.

Alternatively, fiberglass chop or pellets can be used to replace wood on a one to one weight basis. This provides increased strength to the composite but may increase the cost of the final product. In situations where increased strength is required, fiberglass can be used to replace wood fiber. For example, a mix of 60% ½ inch fiberglass chop and 40% polypropylene would have a flex modulus (modulus of elasticity) of 2.5 Million or higher (compared to oak at approximately 1.8 Million). Similarly, a mix of 35% fiberglass chop, 25% wood fiber, and 40% plastic would have a flex modulus (modulus of elasticity) of about 1.6–1.7 Million which is equivalent to oak. In addition, this product would also have a tensile modulus of about 25,000 which gives it twice the strength of high end oak. Straight fiberglass chop may also be used to make the composite.

If straight fiberglass chop is used, it can be added to the wood stream as a straight fiber source. In other words, the fiberglass can be fed directly into the extruder, at the same time as wood. As the wood dries, the fiberglass will mix with the wood. The thermal plastic is then added as if wood was the only fiber used and extruded to the final product. In an alternative embodiment, fiberglass is added to the process as a Twintex™ pellet that is a co-mingle of 60% fiberglass and 40% polypropylene.

In terms of strength, articles of manufacture which use fiberglass will achieve the tensile strength of some soft woods and will achieve about 80% of the strength of some hard woods. With the new designs of the present invention and engineered nucleated polymer, a composite having the strength and flex modulus equal to that of wood can be created. For example, flex modulus of 1.2–1.3 Million, which is equal to soft wood, can be created using the composite of the invention.

As stated above, the composite material also contains thermal plastic. Thermal plastic is used to bind the fiber material together to produce a solid composite material used to form the articles of manufacture. The thermal plastics operate by shrinking to grip the wood/fiberglass pieces as the thermal plastic cools. The preferred thermal plastics are polyethylene and polypropylene. The most preferred thermal plastic is polypropylene. To keep the cost of the article of manufacture made from the composite material low, industrial grade thermal plastic can be used. It is noted that industrial grade thermal plastics can be used, however, to get the strengths and the flex modulus shown above, an engineered grade of polymer that has been nucleated should be used. The nucleated process adds about 20–25% to the flex modulus which is critical in keeping the characteristics high.

Recycled (lowest grade) of polypropylene costs about 12–15 cents per pound where engineered polypropylene cost about 40–50 cents per pound. In some cases, a blend of various grades can be mixed together to reduce cost without diluting the main characteristics of the product. For example, a blend can be used in cases where the final product does not require extreme strength, such as no load fence boards.

Since polyethylene is used heavily in society and can be recycled, it is readily available and is in stable supply. Although this thermal plastic is in stable supply, it is more costly than polypropylene. In addition to being less costly, polypropylene has a number of other advantages over polyethylene. An article of manufacture made from a composite containing polypropylene is stronger than one made from a composite containing polyethylene. Thus, polypropylene provides additional strength to the composite material as compared to polyethylene. Since polypropylene is an under utilized by-product of gasoline production, polypropylene is insulated from price fluctuations associated with the mainstream plastics market. For this reason, as stated above, polypropylene is a cheaper alternative to polyethylene.

To achieve similar characteristics to wood, nucleated polymer i.e.,(BP Amoco 9433) can be used. The superior strength and flex modulus makes this a preferred choice when the composite is used in construction and heavy duty applications.

The composite material may also contain a mixture of polyethylene and polypropylene as the thermal plastic material. Characteristics normally not associated with each of the thermal plastics individually, may be realized when a mixture of polyethylene and polypropylene is used. For example, impact resistance and rigidity are two characteristics that are very important in the production of an article of manufacture made from the composite material. As impact resistance increases, rigidity decreases. In other words, the more flexible the article of manufacture made from the composite material is, the greater the impact it can absorb.

In order not to lose the important characteristics of the composition discussed above, polyethylene can be added only in small quantities before it begins to change the overall characteristics of the composite. No more than 15% polyethylene can be added to the mixture before the characteristics of the composite begin to erode. Preferably, no more than 10% polyethylene is added to mixed composite material. Polyethylene, however, can be added in a capstock mix that is layered on the surface of the product. In this manner the body of the article of manufacture made form the composite is not affected.

Articles of manufacture made from composite material containing various combinations of polypropylene and polyethylene provide different degrees of rigidity and impact resistance. Therefore, in some cases the best thermal plastic used to make the composite is a mixture of both polyethylene and polypropylene. One provider of the polypropylene used to make the composite material is BPAMOCO. The polypropylene provided by this company is called ACCPRO 9433 or 9434. In addition, similar products are also available from Solvay.

To add impact resistance to the polymer, a low density polyethylene in almost any quantity can be added to the polypropylene without losing the traits associated with polypropylene. If a high density polyethylene is added to the homo-polymer to make a co-polymer, only low amounts of polyethylene can be added before the polypropylene traits are lost. Therefore, the percentage of polyethylene verses polypropylene depends on the density of polyethylene being added. For example, an article of manufacture using a composite material having 15% of polyethylene and 85% of polypropylene as the thermal plastic will provide moderate rigidity and impact resistance to the article of manufacture. Alternatively, increasing the percentage of polyethylene and decreasing the percentage of polypropylene will produce an article of manufacture with increased rigidity and decreased impact resistance. Thus, a composite material can be synthesized having desired characteristics not only by varying the type of fiber material used, but also by changing the percentage of polyethylene and polypropylene combined to make the composite. One skilled in the art after reading the present disclosure, would be able to prepare an article of manufacture having desired characteristics by varying the percentage of polyethylene and polypropylene used to bind the fiber material of the composite.

The composite material used to make the article of manufacture may also include enhancers which facilitate the mixing of the fiber material and thermal plastic. Examples of enhancers include, but are not limited to, fatty acids, stearic acid, benzl peroxide, dichloro-s-trianzine, isocyanates, and maleic anhydride. These enhancers are used to disaggregate the solid fibers, allowing for better adhesion between the fiber material and thermal plastic. A similar phenomena occurs when the polypropylene is run hotter.

In one embodiment of the invention, the enhancer used is maleic anhydride. Maleic anhydride is available in two forms. The first being as an additive that can be added to the process stream at the production line. The second form is already pelletized in the thermal plastic material and is known as Maliated Polypropylene (MAPP). MAPP is available from Rohm and Haas Company (Tymor 2E02 and Tymor 2500EX), Uniroyal Chemical, Eastman Chemical and Honeywell. Several other oils are also available that serve the same purpose.

Maleic anhydride is the preferred enhancer because it has been shown to provide a bond between fillers containing hydroxyl groups, i.e., wood fiber, and a polymer matrix, i.e., polypropylene. Therefore an article of manufacture made from a composite material containing maleic anhydride exhibits increased strength.

The main purpose of using enhancers is to increase the percentage of wood coverage of the fiber with the thermoplastic. This is known in the industry as increasing the percentage of "wet out" of the wood fiber. Both the choice and the amount of enhancer used in the composite material is a function of the type and amount of fibers and thermal plastic material used to make the composite. The mixing compounding conditions also play a role in choosing the amount and type of enhancer. For example, if the composite material contains wood as the fiber material and polypropylene as one of the thermal plastics in a co-polymer then the preferred enhancer is maleic anhydride. Since it is within the scope of the invention to use a combination of thermal plastics, it is also within the scope of the invention to use a combination of enhancers when making the composite material. The amount of enhancer that can be added to the fiber/plastic mixture can be up to 5% by weight. Preferably up to 2% by weight and most preferably up to 1% by weight.

Once the fiber material, thermal plastic(s), and enhancer (s) are mixed, a dye coloring may be added to the composite material. The dye coloring added to the composite material should be thoroughly mixed so that the resulting composite material is uniform in color. When the article of manufacture is formed from the composite material, the article of manufacture will also have a uniform color. The amount of the color added to the composite depends on the shade or intensity of color desired. In other words, when a dark color is desired, more dye is added to the composite material than when a lighter color scheme is desired. Either the wood mix or the plastic stream or both can be dyed to achieve the desired affect.

Articles of manufacture may be subjected to a variety of different extremes depending on where it is ultimately used. Different additives can be infused into the composite material used to make the article of manufacturer in order to reduce the damage caused by exposure to such extremes.

For example, when the article of manufacture is made from the composite material that is used under conditions of extreme heat and/or flame, fire retardant additives may be added to the composite material to prevent damage to the article of manufacture. Examples of heat and/or fire retardants include Bromium or Antimoniumoxide. Similarly, if the article of manufacture is used in places where it may be exposed to insects, insect resistance additives may also be added to the composite material to reduce or prevent damage to the article of manufacture by insects. Insect resistance can also be achieved upon formation of the composite. For example, if a board is constructed from 40% wood and 60% polymer it is probable that the polymer will effectively cover the wood thus making it insect or rot resistant. In this case, no additional additives are needed.

To protect the article of manufacture from ultraviolet light (UV), UV-resistance additives can be added to the composite material to reduce or prevent damage to the article of manufacture by UV light. There are a number of levels of UV protection. The first level is when UV light protectant chemical is added to the process stream or as an addition to the pelletized thermal plastic. This can be either added as part of the thermal plastic pelletizing process or grouped into an additive package that is infused into the production stream. The main goal of the first level of UV protection is to protect the thermal plastic matrix from degrading in the sun and causing a catostrophic failure. The UV additives are added to the thermoplastic at less than 1% of the total thermal plastic weight, this however will protect the plastic but will not protect the wood chip filler. In other words, the product will still fade to the color of aged wood since the wood chips are not protected and will continue the fading and aging process. Similarly, a UV protectant can also be added to the wood stream.

The second level or more advanced level of UV protection inhibits wood fading. Here a "capstock" is added to the surface of the board that has additives to protect against the UV wavelengths that fade wood. This capstock can be applied as a co-extrusion or can be applied as a veil that protects the surface and product against UV damage. This is a cheaper method of UV protectant than level one but is more challenging to apply.

In one embodiment, a veil is specially manufactured as a polyethylene or polypropylene veil that is less than 8 millimeters thick. This veil contains the UV protectors added to the thermoplastic prior to application. Thus, the veil when applied protects the complete structure of the composite including the wood components.

To protect the article of manufacture from fungus or the like, fungus resistance additives may be added to the composite material to reduce or prevent damage to the article of manufacture by excessive growth of fugii or the like. If the amount of thermal plastic or fiberglass is increased so that is covers the wood fibers you essentially eliminate the need to add additives designed to protect the product from rot, insects, or fungus.

To protect the article of manufacture from oxidation, heat resistance antioxidants may be added to the composite material to reduce or prevent damages to the article of manufacture from oxidation.

The composite material may contain one or more of the additives described above depending on the conditions in which the article of manufacture made from the composite will be used. The composite material may contain up to 5% of the total weight of the composite. Preferably, the composite material may contain no more than 2% by weight of the composite. Most preferably, the composite material may contain no more than 1% by weight of the composite.

After all the ingredients have been added to the composite material, the composite material is shaped into the article of manufacture. A film or veil or co-extrusion layer can then be added to the surface of the article of manufacture to provide additional durability to its surface. The film or veil is selected from the group consisting of polypropylene, polyethylene and polyester. The film or veil increases impact resistance, scuff resistance, fading and weathering.

The process of making the composite material, forming it into an article of manufacture and adding a film and/or veil is described below.

A. Preparing the Ingredients

When wood fiber is used to make the composite material, special care must be taken to insure that the supply of wood fiber is consistent in size, properly screened and free of contamination.

The first step in preparing the wood fiber is to sort and classify the wood source. For example, soft woods need to be sorted from hardwoods and colored woods need to be sorted from plain woods. Pine needs to be sorted from Oak and even though both Oak and Walnut are hardwoods, they are of different color so they must also be sorted to maintain uniformity. This sorting process allows the texture and other characteristics of the fiber supply to be consistent, which is very important in producing a consistent, quality oriented product. Sorting texture and color before using the wood fiber to make the composite produces an article of manufacture with more uniform handling, and better structural and esthetic qualities than processes using a composite of wood fibers straight from recycled sources. The use of hardwood fibers as the fiber source in the composite used to make the article of manufacture greatly increases nail and screw holding capacity, as well as, increasing the overall strength of the article of manufacture made from the composite.

After sorting the different woods into "batches," the product is ground into wood chips using at least a two stage grinding process. The "batches" are first ground into a rough grind similar in appearance to a garden mulch with sizes ranging from a very small wood flour particle up through strips or chunks of wood that may be as large as six inches long. The first grind is done with a large commercial sized tub or horizontal grinder having large capacity and power. Once the first grind is completed, the product of the first grind is reground using a smaller grinder or a hammer mill which again provides a variety of sizes of wood particles ranging from the very small wood flour category up to saw dust size particles that may pass over a 20 mesh screen. It may take up to three secondary grinds or more to produce a product that is acceptable and consistent in size.

As mentioned above, size and consistency of size is very important in how well the wood fiber works in the process and directly affects the quality and attractiveness of the article of manufacture made from the composite material. To assure size and consistency of the wood fiber, the wood fiber is screened over a 30–50 mesh screen. Preferred fibers are those screened over a 40 mesh screen. The small and consistent size of wood fiber makes a very smooth product finish.

If the wood fiber source is screened too small, the weight of the board increases and the strength of the board decreases. This is undesirable. Wood ground and screened over a 40 mesh screen typically weights between 13 and 15 pounds per cubic foot depending on whether it is soft or hardwood, soft wood being lighter. This compares to unground wood that weighs 30–35 pounds per cubic foot. The difference in the weight is contributed to the amount of cell or air space that is present in a cubic foot of wood. Obviously, 40 mesh ground wood has far more air space than just plain unground wood. Taking this further, the finer the grind of the wood, the less air space and the heavier the weight of the wood fiber per cubic foot. Weight is one factor that is considered in making the article of manufacture. Overall, a preferred article of manufacture should weigh the same or less than the wood it is replacing. One way this can be achieved, as discussed above, is by using voids in the final product. Thus, it has been found that wood ground through a 40 mesh or slightly larger screen makes a product that most closely resembles wood. Weight continues to be a problem because as you add the thermal plastic, that has a density of 40 pounds per cubic foot, the weight goes back up.

FIG. 1 shows a panel made of the composite of the invention which has several strategically placed voids 10. These voids are used to reduce the overall weight and cost of the product but do to compromise the integrity of the final product. The "void" pattern shown in FIG. 1 comprises six spaces, 3 of which are mirror images of the other three and are separated by a median line 20. The length of the panel 30 is at least double the width of the panel 40. The voids are positioned so that they are off-center so as to produce a panel having more solid space on one side compared to the other.

The first void 50, is larger than the second void 60, but smaller than the third void 70. The three voids are positioned below one another when moving from the top of the panel 80 lengthwise to the bottom of the panel 90. Three identical voids are positioned as a mirror image across the median line 20. The voids provide an article of manufacture having superior strength and at the same time decreased weight as compared to other wood products.

Similarly, FIG. 2 also shows a panel made of the composite of the inventor which has several strategically placed voids. Two of the voids 210 are in the form of a rounded triangle and are located at each end of a series of voids. Five of the voids 200 are "pill shaped voids that are positioned between the two end voids 210 with a given amount of space between each void. This space between and the number and size of each void will vary according to the overall length of a panel. The overall structure 250 has a solid portion 260 that surrounds each of the voids. The length of the structure 260 is at least double that of the width of structure 260. This arrangement of voids and solid surfaces produces a strong panel having reduced weight.

To further control the weight of the article of manufacture, a mix of soft woods and hardwoods may be used to produce the composite material. In this manner a lower weight is traded for the ease of processing, strength and production efficiencies of hardwoods.

Size of the wood fiber is also a factor in the strength of the article of manufacture produced from the composite material. Strength of the article of manufacture is a function of fiber length and direction, which is also a function of wood fiber size. All of these factors combined are directly related to the final weight of the article of manufacture made from the composite material. Wood fiber size and composite material produced from wood fibers sized through a 20 to 40 mesh screen have the most desirable characteristic.

Moisture is another critical factor that must be controlled when handling wood. A moisture of 6% is desirable and allows for the most efficient handling of the wood fiber. If moisture increases, the wood fiber tends to clump and does not handle efficiently. Drying the wood so that it has a moisture content of less than 6% requires too much energy and the wood will regain the moisture in the storage tanks. Further drying of the wood fiber will occur in the mechanical extrusion of the manufacture process.

The other ingredients added to the composite material including other sources of fiber such as fiberglass, agricultural and industrial of producers, enhancers and protective additives do not require any special handling or preparation. The fiber materials can be substituted for the wood fiber by a weight bases and the enhancers and protective additives are used in small quantities and come ready to use straight from the manufacturers. Any grade plastics can be used to bind the wood or other fiber materials used together and also comes "ready to use" from the supplier.

The Process

The composite material is made using a Davis-Standard Woodtruder™ extruder line. The process below is described using wood as an example. It is noted, however, that the same process can be used to produce a composite material comprising fiberglass, industrial by-products, agricultural by-products or mixtures thereof instead of wood fiber.

The process begins by screening the wood fiber over a 20–40 mesh screen to produce wood fiber having a consistent size and approximately 6% moisture. This fiber is fed into the main extruder twin screw barrel via a gravimetric feeder. This type of feed system provides a consistent feed of wood fiber on a weight basis. Monitoring the weight is very important to get a consistent ingredient mix which affects the final quality of the article of manufacture produced from the composite material.

The main barrel of the extruder is equipped with counter-rotating twin screws that pushes the fiber material forward at a low revolutions per minute (rpm) and low shear. A heated venting area of the extruder removes moisture from the fiber material. This allows a high volume of fiber material to be dried "in-line" during production. Removal of moisture is critical to the process because any moisture remaining in the wood fiber/plastic blend is converted to steam and manifests itself in the form of foam. This can disrupt the processes and lead to an unacceptable finished article of manufacture.

In the initial extruder process, moisture is managed by a combination of predrying the fiber material from their ambient moisture content of 6–8% to 2–3%; and by applying a vacuum to the vent zones in the extruder barrel during compounding to remove the remaining moisture. Temperature during the wood drying process is maintained at approximately 190 degrees F., to avoid scorching or burning of the wood fiber. Maintaining the temperature below the melting point of the thermal plastic avoids degradation of the wood fiber and a reduction in strength of the final product.

In a separate extruder, the thermal plastic is melted to a temperature of approximately at 425 degrees F. During the melting process, the additives are added and mixed into the melted thermal plastic. By using a separate extruder for the melting process of the thermal plastic and mixing of the additives, this process can be completed at a higher temperature separate from the wood fiber. This eliminates the risk of scorching or burning the wood fiber during the melting and additive mixing process. The high temperature used in this process allows the melted thermal plastic to completely encapsulate the wood fiber once its is added to the screened wood fiber. The addition of an enhancer such as maleic anhydride, facilitates the forming of a very strong bond between the wood fiber and the thermal plastic. Other enhancers discussed above can be added as well.

The hot thermal plastic and additive mixture is injected into the mixing section of the main extruder barrel. Depending on the product, about 40% to about 70% of the mixture by weight is wood fiber and the thermal plastic and additives combined comprise about 30% to about 60% of the mixture by weight. Additives can comprise up to about 5% of the mixture by weight, depending on the number of additives and type of additives selected. The mixing section thoroughly compounds the plastic/additive/fiber composite. The mix is then vacuum vented to remove any remaining moisture.

If too much wood is added, the wood fibers are not thoroughly covered by the thermal plastic and the additive mixture. This results in a decrease in strength and physical properties of the article of manufacture made from the composite material. For example too much wood may cause the product to rot, mold and absorb water like other wood products. Another problem that arises when too much wood is added to the mixture is that the article of manufacture made from the composite material becomes quite brittle and is subject to impact breakage. Therefore, it is essential that the amount of wood fiber added to make the composite is strictly controlled.

The plastic/additive/fiber composite is moved through the metering section of the barrel to dies that provide the shape for the article of manufacture. It is important to shape the material while it is still hot. The composite material can be extruded with voids in the interior of the shape to facilitate cooling, curing and also to reduce the weight of the resulting article of manufacture. The cross-section of the article of manufacture has been engineered to create the voids while maintaining the strength of the article of manufacture. In other words, the voids are optimized to create the largest void space, lowest weight and maximum strength.

Leaving the die, the article of manufacture is cooled in two cooling tanks, each 20 feet long. In the first tank, the article of manufacture enters the tank at approximately 425 degrees F. and is cooled to approximately 200 degrees F. using a water spray system that sprays directly on each surface of the article of manufacture. The water spray is managed so that it is sprayed equally to all surfaces at the same time so as to dissipate the heat evenly. Even dispersion of the heat prevents warping and surface irregularity of the article of manufacture. The temperature of the water used to cool the article of manufacture is held constant at 80 degrees F. and is circulated through a system wide cooling tower. To insure that the cooling water is evenly dispersed on the article of manufacture, a matted type conveyor belt is used. Using a matted type conveyor belt permits water to be sprayed over the total surface of the article of manufacture resulting in even cooling. This is in contrast to a solid conveyor that would not allow the cooling water to spray over the total surface of the article of manufacture. In addition, the afore-mentioned cooling tank allows the article of manufacture made from the extruded composite material to be cooled and pulled through the cooling tanks free of the stress normally associated with mechanical pullers.

In the second cooling tank, the article of manufacture is cooled from approximately 200 degrees F. to room temperature. In this tank, chilled water is used to do a final cure of the article of manufacture. The temperature of the water used in this process is approximately 40 degrees F. and is sprayed on the surfaces of the article of manufacture in the same manner as water was spayed on the surfaces of the article of manufacture in tank one.

After proper cooling and curing the article of manufacture is sawed to desired lengths with an in line cutoff saw. The article of manufacture can be cut into building materials including building panels, railcar floors, railcar walls, truck floors, truck walls, window sills, window jams, doors, house siding, garage doors, furniture and other articles of manufacture that is normally made from wood or wood-like products.

Once the article of manufacture is formed a veil may be added for further strength and protection. A veil is a very thin film, normally less than 8 millimeters that is added to the surface of a product for protection against oxidation, discoloration, insect destruction, etc. For example, a veil can be added to the article of manufacture to increase durability. The veil may be added prior to or after the material are cut into the desired shapes. The veil can be made from polypropylene, polyethylene, or polyester materials. The weave of the veil is normally more important than the base material. A strong weave, such as polyester, is desirable if the material to be used as a printed or is a design surface. The weave or veil is applied to the surface of the product (decking board or plank) using a heating process. In other words, the surface of the product is heated up to approximately 400 degrees F. which melts the plastic surface. In the case of polyester or weave the veil is passed into the melted plastic which extrudes through the weave and makes the veil part of the surface of the product. When cooled the thermoplastic of the surface fully encompasses the veil.

In another embodiment, the veil can be co-extruded when the article of manufacture is being produced. This process requires a more complicated dye system but reduces the amount of time required to produce the product.

In the case of a polyethylene or polypropylene veil, the thermal plastic in the veil melts into the thermal plastic of the product forming one homogenous layer that is not bonded. Thus the surface veil is incorporated into the surface of the product.

While the invention has been illustrated and described with respect to specific illustrative embodiments and modes of practice, it will be apparent to those skilled in the art that various modifications and improvements may be made without departing from the scope and spirit of the invention. Accordingly, the invention is not to be limited by the illustrative embodiment and modes of practice. For example, different fiber material within the scope of the invention can be substituted for the wood fiber discussed above.

What is claimed is:

1. A building material article of manufacture, comprising: a fiber material and a thermal plastic material, the fiber material comprising about 35% by weight of fiberglass and about 25% by weight of wood, and the thermal plastic material comprising about 40% by weight of plastic and having a MFI (Melt Flow Index) of about 8 to about 15, wherein the article is formed by mixing and extruding the fiber and thermal plastic materials at predetermined temperatures and cutting the extrusion to desired lengths.

2. The article of manufacture according to claim 1 wherein the wood is of a size which fits through a 20 to 50 mesh screen and weighs about 13 to about 15 pounds per cubic foot.

3. The article of manufacture according to claim 2 wherein the wood fits through a 40 mesh screen.

4. The article of manufacture according to claim 1 wherein the thermal plastic material is polyethylene or polypropylene.

5. The article of manufacture according to claim 4 wherein the thermal plastic is polypropylene.

6. The article of manufacture according to claim 1 further comprising at least one enhancer selected from the group consisting of stearic acid, benzl peroxide, dichloro-s-triazine, isocyanates, and maleic anhydride in an amount of about 3% by weight.

7. The article of manufacture according to claim 6 wherein the enhancer is maleic anhydride.

8. The article of manufacture according to claim 1 further comprising at least one additive selected from the group consisting of dyes, ultraviolet protecting additives, flame retardants, fungus retardants, heat resistant antioxidants, and insect retarding additives.

9. The article of manufacture according to claim 8 further comprising at least one of the following additives:

about 0.02% to about 2% of dye coloring;

about 0.02% to about 1% of fire retardation additive;

about 0.12% to about 1% ultraviolet protection additive;

about 0.12% to about 1% of insect resistance additives; and

10. The article of manufacture according to claim 1 further comprising a film or veil on a surface of the article of manufacture providing additional durability or UV resistance to the surface of the article of manufacture.

11. The article of manufacture according to claim 10 wherein the film or veil is made from a material selected from the group consisting of polypropylene, polyethylene, and polyester.

12. The article of manufacture according to claim 1 wherein the article of manufacture is a building board or building panel.

13. The article of manufacture according to claim 1 wherein the article of manufacture has a flex modulus of about 1.2 to about 1.3 Million.

14. The article of manufacture according to claim 1 wherein the fiberglass is in the form of chop and is about ¼ inch to about 1 inch in length.

15. The article of manufacture according to claim 1 wherein the article of manufacture has a flex modulus up to about 2.0 Million.

16. The article of manufacture according to claim 1 wherein the thermal plastic material is polyethylene.

17. The article of manufacture according to claim 1 wherein the thermal plastic material comprises polyethylene and polypropylene.

18. The article of manufacture according to claim 6 wherein the enhancer is in an amount up to about 5% by weight.

19. The article of manufacture according to claim 1 further comprising a capstock co-extrusion.

20. The article of manufacture according to claim 1, wherein the article of manufacture has a flex modulus of about 1.6 million to 1.7 million.

21. The article of manufacture according to claim 1 wherein the article of manufacture has a flex modulus of up to about 2.0 Million.

22. The article of manufacture according to claim 1 wherein the articles comprises solid portion defining a plurality of cross-sectional voids.

23. The article of manufacture according to claim 22 wherein the voids are of differing circumferential sizes.

24. The article of manufacture according to claim 12 wherein the article is extruded with a rectangular cross section and a plurality of voids having a diagonal orientation with respect to the cross section.

* * * * *